United States Patent
Beneteau et al.

(10) Patent No.: US 6,696,843 B1
(45) Date of Patent: Feb. 24, 2004

(54) DEVICE AND METHOD FOR ULTRASONIC MEASUREMENT OF A FLUID FLOW RATE COMPRISING A SIGMA-DELTA BAND PASS ANALOG-TO-DIGITAL CONVERTER

(75) Inventors: Lionel Beneteau, Fontenay aux Roses (FR); Philippe Benabes, Les Ulis (FR)

(73) Assignee: Schlumberger Industries, S.A.S. (FR)

( * ) Notice: Subject to any disclaimer, the term of this patent is extended or adjusted under 35 U.S.C. 154(b) by 0 days.

(21) Appl. No.: 09/869,396
(22) PCT Filed: Dec. 22, 1999
(86) PCT No.: PCT/FR99/03266
§ 371 (c)(1),
(2), (4) Date: Aug. 20, 2001
(87) PCT Pub. No.: WO00/39538
PCT Pub. Date: Jul. 6, 2000

(30) Foreign Application Priority Data

Dec. 29, 1998 (FR) .............................................. 98 16608

(51) Int. Cl.$^7$ ................................................ G01R 27/26
(52) U.S. Cl. ...................................... 324/640; 73/861.25
(58) Field of Search ........................ 73/861.25, 861.28, 73/361.31, 861.32; 324/640, 701

(56) References Cited

U.S. PATENT DOCUMENTS

| | | | | |
|---|---|---|---|---|
| 5,178,018 A | * | 1/1993 | Gill ..................... | 73/861.28 |
| 5,742,246 A | * | 4/1998 | Kuo et al. ............ | 341/143 |
| 5,777,238 A | * | 7/1998 | Flecter-Haynes ...... | 73/861.31 |
| 5,814,737 A | * | 9/1998 | Brown .................. | 73/861.28 |
| 5,859,603 A | * | 1/1999 | Noguchi et al. ...... | 341/77 |
| 6,003,385 A | * | 12/1999 | De Vanssay et al. .. | 73/861.25 |
| 6,331,833 B1 | * | 12/2001 | Naviasky et al. ..... | 341/143 |
| 6,388,601 B1 | * | 5/2002 | De Gouy et al. ..... | 341/155 |
| 6,484,590 B1 | * | 11/2002 | Kleven et al. ........ | 73/861.32 |

* cited by examiner

Primary Examiner—N. Le
Assistant Examiner—Walter Benson
(74) Attorney, Agent, or Firm—Straub & Pokotylo; Michael P. Straub (57) ABSTRACT

An ultrasound apparatus for measuring a fluid flow rate includes a processor which receives an analog signal from a receiver transducer then transforms it into a digitized signal used for determining the fluid flow rate. The processor includes a bandpass sigma-delta converter having a bandpass loop filter, and a digital-to-analog converter in a feedback loop.

10 Claims, 9 Drawing Sheets

PRIOR ART

DEVICE AND METHOD FOR ULTRASONIC MEASUREMENT OF A FLUID FLOW RATE COMPRISING A SIGMA-DELTA BAND PASS ANALOG-TO-DIGITAL CONVERTER

FIELD OF THE INVENTION

The present invention relates to an ultrasonic fluid flow measuring method and apparatus including a sigma-delta bandpass analog-to-digital converter.

An ultrasonic fluid meter comprises two ultrasound transducers defining a measurement path between them. Each transducer is used alternately in emission mode and in reception mode.

The principle of measuring a fluid rate acoustically consists in determining the speed of the flowing fluid, by determining the time the acoustic signal takes to propagate between the two transducers both in the upstream direction and in the downstream direction relative to the fluid flow. The travel time of the ultrasound wave is calculated on the basis of measuring time and/or measuring phase.

The flow rate and the volume of fluid that has flowed over a given length of time can then easily be determined on the basis of the measured fluid speed.

BACKGROUND OF THE INVENTION

Such ultrasound apparatus is well known to the person skilled in the art and is described, for example, in European patent application EP 0 807 824. The same applies to the acoustic measurement method as described for example in European patent application EP 0 852 725.

Fluid meters relying on the ultrasound principle to measure flow rate are entirely self-contained and they do not depend on an electricity distribution network. These meters contain electronics that is becoming ever more sophisticated, and they make it possible to improve measurement performance, giving consumers various kinds of information about consumption and enabling consumption to be read remotely and/or bills to be paid remotely, and they are powered by means of a battery of limited lifetime, which lifetime depends very strongly on the architecture of the electronic circuits used.

Figure 1:
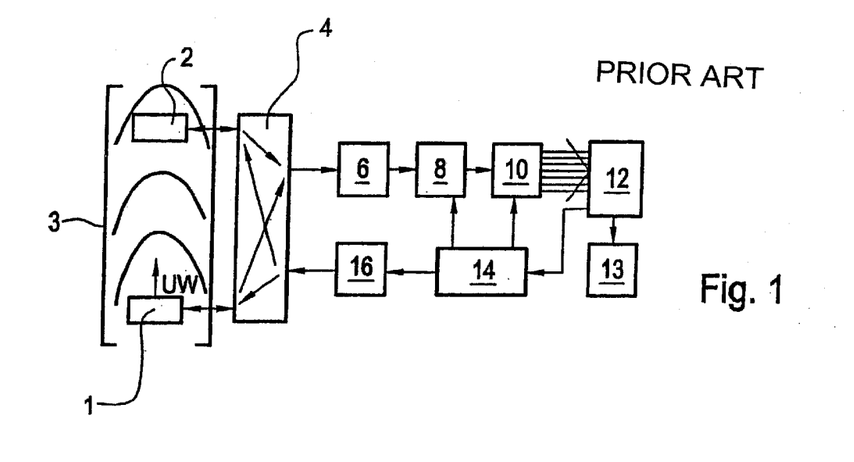
FIG. 1 is a block diagram of the complete measurement acquisition and processing system of a prior art ultrasound fluid meter.

The architecture of a complete system for acquiring and processing measurements in a prior art ultrasound fluid meter is shown in FIG. 1. Such an ultrasound fluid meter comprises two transducers 1 and 2 placed in a cavity 3 along which a fluid flows. The transducers are both connected to a switch unit 4 in such a manner that when the first transducer 1 operates in emission mode the second transducer 2 operates in reception mode, and vice versa. When the first transducer 1 emits an ultrasound wave UW which propagates in the fluid flow, the transducer 2 receives said ultrasound wave after a length of time that is characteristic of the flow speed, and it transforms the ultrasound wave into an analog signal. The switch unit 4 is connected to an amplifier 6 having programmable gain which serves to provide full-scale amplification and filtering of the analog signal for application to an analog-to-digital converter 8. The programmable gain amplifier 6 is connected to an 8-bit analog-to-digital converter operating at a sampling frequency of 320 kHz. The analog-to-digital converter 8 delivers a digital signal as is required for determining the propagation time of the acoustic signal UW between the two transducers 1 and 2. The analog-to-digital converter 8 is connected to a random access memory (RAM) 10 having capacity of 2×256 bytes which stores the signals, until they can be processed by the microcontroller 12. The microcontroller 12 which processes stored signals and calculates results relating to flow rate is connected to a set of various units 13 serving, for example, for the purposes of display, communication with the outside, managing energy saving modes, and storing operating data. The microcontroller 4 is also connected to a sequencer 14. The sequencer 14 controls the sequences of ultrasound waves fired by the transducers 1 and 2 via a transmission buffer 16 comprising a digital-to-analog converter and an amplifier, and it also controls the sampling performed by the analog-to-digital converter 8 and the storing of signals in the memory 10. A battery (not shown) operates in conventional manner via a set of connections (not shown) to provide the energy necessary to enable the various components to operate.

The combination of a programmable gain amplifier and an analog-to-digital converter corresponds to architecture which is complex and which consumes 30% to 40% of the energy requirements of the electronics of the meter. In addition, such an analog-to-digital converter introduces quantization noise while digitizing, thereby degrading measurement accuracy. Such a "conventional" analog-to-digital converter converts a signal with constant resolution providing its frequency lies in the range DC to half the sampling frequency.

It is known to the person skilled in the art that transformation of an analog signal into a digital signal by means of an analog-to-digital converter is a major source of error commonly known as quantization noise. A technique known to the person skilled in the art for reducing such quantization noise is using sigma-delta conversion (see for example "Delta-sigma data converters—theory, design, and simulation" by Steven R. Norsworthy et al., IEEE Press, New York, 1997). Noise reduction is obtained by sigma-delta conversion because the architecture of a sigma-delta converter enables it to take account of the conversion errors made during past conversions in order to correct future conversions.

Furthermore, another aspect of sigma-delta conversion relates to the particular way the information that results therefrom is encoded. Sigma-delta conversion is a principle for encoding information on a small number of bits, sampled at a high frequency so as to enable resolution to be increased subsequently. This conversion principle is based on operation that is analogous to that of delta conversion, which consists in encoding the difference between the amplitude of a sample and the amplitude of the preceding sample. For example, when encoding on a single bit, a sigma-delta converter generates a binary output stream (alternating "0s" and "1s") constituted by a periodic regime whose fundamental period is proportional to the input voltage. The converter responds as a voltage-to-frequency converter which is synchronized on a sampling clock. A "decimator" digital filter is placed at the output from the sigma-delta converter and converts the signal encoded on a small number of bits at high frequency into a signal at a lower bit rate but encoded on a larger number of bits.

The principle of sigma-delta conversion can be extended to converting signals centered around a particular frequency. The converter used is then a bandpass sigma-delta converter. The filter of the converter which was previously an integrator is replaced by a resonator. The digital filter at the outlet from the sigma-delta converter is no longer a decimator but a bandpass filter followed by a demodulator. In the field of telecommunications, and in particular in the field of digital radio, it is known to use bandpass sigma-delta analog-todigital converters in order to eliminate quantization noise (see for example "A fourth-order bandpass sigma-delta modulator" by Steven A. Jantzi et al., IEEE Journal of Solid State Circuits, Vol. 28, No. 3, March 1993, pp. 282 to 291).

The object of the present invention is to remedy the drawbacks of the measurement acquisition and processing system of prior art ultrasound fluid meters, and in particular to reduce the complexity and the power consumption of the digitizer.

Another object of the present invention is specifically to reduce quantization noise during digitization of the analog signal and to increase the performance of the converter.

In the invention, these objects are achieved by replacing the prior art digitizing system by a sigma-delta converter.

More precisely, the present invention provides ultrasound apparatus for measuring a fluid flow rate, the apparatus comprising:

first and second transducers placed in the fluid whose flow rate is to be determined, one of the transducers, also referred to as the "emitter" transducer, operating in emission mode while the other transducer, also referred to as the "receiver" transducer, operates in reception mode, the emitter transducer being designed to emit an ultrasound wave into the fluid and the receiver transducer being designed to transform said ultrasound signal into an analog signal; and processor means for processing said analog signal, the processor means being connected to the receiver transducer and being designed to transform said analog signal into a digitized signal used for determining the fluid flow rate;

the apparatus being characterized in that said analog signal processing means comprise a bandpass sigma-delta converter comprising:

a bandpass loop filter whose input is connected to the output of said receiver transducer;

an analog-to-digital converter whose input is connected to the output of said loop filter, the output of said analog-to-digital converter forming the digital output of said analog-to-digital converter; and a digital-to-analog converter forming a feedback loop, connecting the output of the analog-to-digital converter to the input of said loop filter.

The transducers used in apparatus of the invention are piezoelectric type transducers possessing a bandpass transfer function that is limited in frequency, e.g. 40 kHz±1.5 kHz. Since the useful information lies solely in this frequency band, it is advantageous to amplify and convert only those signals which lie in this frequency band.

In a preferred second embodiment of the present invention, the ultrasound apparatus for measuring fluid flow rate comprises a bandpass sigma-delta converter having a bandpass loop filter that is constituted by the receiver transducer.

The transducer thus acts in alternation as a receiver and as a bandpass filter in the loop of the bandpass sigma-delta converter, thus making it possible to optimize analog-to-digital conversion in the frequency band of interest.

The present invention also provides an ultrasound method of measuring a fluid flow rate that includes a bandpass sigma-delta analog-to-digital converter.

In the invention, an ultrasound method of measuring a fluid flow rate between two transducers, in which the fluid flow rate is determined by measuring the propagation time and/or by measuring the phase shift of acoustic signals propagating in the flowing fluid between two transducers in the upstream and downstream directions of the fluid flow, comprises:

an emission step consisting in emitting an acoustic signal UW into the fluid whose flow rate is to be determined;

an acoustic-to-analog conversion step consisting in transforming said acoustic signal UW into an analog signal S2;

an analog-to-digital conversion step of order N consisting in transforming said analog signal S2 into a digital signal S3; and a step of determining acoustic phase shifts and propagation times consisting in determining the acoustic phase shifts and the propagation times on the basis of the digitized signal S3;

the method is characterized in that the analog-to-digital conversion step of order N implemented by a sigma-delta converter comprises:

an estimation step consisting in estimating the quantization error $q_{N-1}$ that occurs during the digitizing step of order N-1, for use in the digitizing step of order N;

a subtraction step consisting in subtracting the estimated quantization error $q_{N-1}$ from the analog signal S2; and a digitizing step consisting in digitizing the analog signal S2 minus the estimated quantization error $q_{N-1}$.

Advantageously, the acoustic-to-analog conversion step consisting in transforming said acoustic signal UW into an analog signal S2 comprises:

a step of converting the acoustic signal UW into analog signal S1; and a step of truncating the analog signal S1 into an analog signal S2.

In advantageous manner, the step of determining the acoustic phase shifts and the propagation times consisting in determining the acoustic phase shifts and the propagation times on the basis of the digitized signal S3 comprises:

a step of filtering the digital signal S3 into a filtered digital signal S4; and a step of calculating acoustic phase shifts and/or propagation times on the basis of the filtered digital signal S4.

Advantageously, the estimation step consisting in determining an estimate of the quantization error is implemented by the receiver transducer.

Other characteristics and advantages of the invention appear in the following detailed and non-limiting description of various embodiments given with reference to the accompanying figures, in which:

FIG. 2.a is a time plot of the signal S1;

FIG. 2.b is a spectrum plot of the signal S1;

FIG. 2.c is a time plot of the signal S2;

FIG. 2.d is a spectrum plot of the signal S2;

FIG. 2.e is a time plot of the signal S3;

FIG. 2.f is a spectrum plot of the signal S3;

FIG. 2.g is a time plot of the signal S4;

FIG. 2.h is a spectrum plot of the signal S4;

DETAILED DESCRIPTION OF THE PREFERRED EMBODIMENTS

Figure 2:
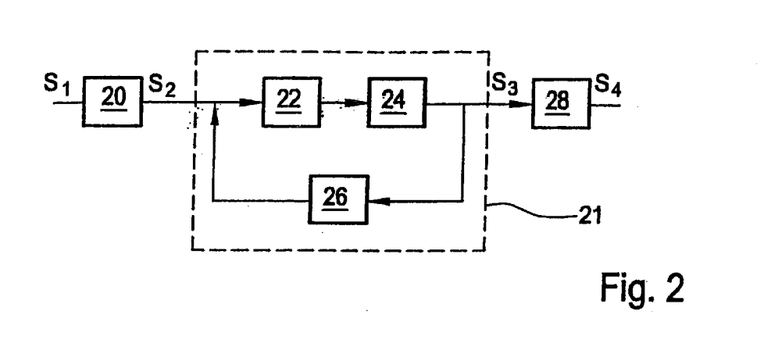
FIG. 2 is a block diagram of the acquisition system of an ultrasound fluid meter of the invention.

FIG. 2 is a block diagram of the acquisition system of an ultrasound fluid meter, and more particularly of the analog-to-digital converter system of the invention. The remainder of the measurement acquisition and processing system is identical to that shown in FIG. 1 and is not shown again in FIG. 2. Again, a battery (not shown) acts in conventional manner via a set of connections (not shown) to supply the energy required to run the various components.

The ultrasound wave UV on the basis of which time and phase measurements are performed is a narrow-band signal whose frequency is centered on the "emission" frequency of the transducer, e.g. 40 kHz. By the direct piezoelectric effect, this ultrasound wave UW gives rise to an analog signal S1 at the terminals of the receiver transducer. The analog signal S1 whose variation as a function of time is shown in FIG. 2.*a* is a signal centered on the resonant frequency of the emitter transducer, as shown in FIG. 2.*b*. The analog signal S1 from the receiver transducer 2 is amplified by the amplifier 20 connected to the output of the receiver transducer 2 via the switch unit 4. The analog signal S1 is subject to time truncation, thereby eliminating interfering echoes coming from successive reflections of the ultrasound wave in the cavity. The time appearance and the spectrum appearance of the analog signal S2 which has been subjected to truncation are given in FIGS. 2.*c* and 2.*d* respectively. The amplifier 20 is connected to a bandpass sigma-delta converter 21. The sigma-delta converter comprises a bandpass loop filter 22 whose input is connected to the output of the amplifier 20, an analog-to-digital converter 24 whose input is connected to the output of said bandpass loop filter, and a digital-to-analog converter 26 placed in the feedback loop connecting the output of the analog-to-digital converter 24 to the input of said loop filter 22. Advantageously, the analog-to-digital converter 24 is a 1-bit analog-to-digital converter, e.g. a comparator, and the digital-to-analog converter 26 is a 1-bit digital-to-analog converter. At the output from the bandpass sigma-delta converter, the analog signal S2 has been transformed into a digital signal S3 whose time appearance as shown in FIG. 2.*e* corresponds to a binary stream. The signal S3 of FIG. 2.*e* is a signal encoded on 1 bit at a high sampling frequency, e.g. 320 kHz. In FIG. 2.*f*, it can be seen that its noise spectrum is different from the spectrum of the useful signal, thus making it possible to eliminate interfering noise effectively by filtering. The output from the bandpass sigma-delta analog-to-digital converter 21 is connected to a bandpass filter 28. This filter serves to reject noise lying outside the working band so as to obtain better synchronous detection at the output from the converter 21, and also so as to enable the signal to be encoded on a larger number of bits at a frequency that is lower than the sampling frequency. The resulting signal is shown in FIG. 2.*g*, and its spectrum appearance is shown in FIG. 2.*h*. The bandpass filter 28 is connected to the RAM 10.

The bandpass sigma-delta analog-to-digital converter provides a very large signal-to-noise ratio in a frequency band that can be configured by the converter architecture used. In contrast, outside this frequency band, the level of conversion noise is very high. Thus, a bandpass sigma-delta analog-to-digital converter can be used for optimizing analog-to-digital conversion in the band of interest for transducer emission.

Furthermore, the signal is converted on a single bit, thereby considerably simplifying the digital processing that follows the bandpass sigma-delta analog-to-digital converter.

This simplification of the analog portion of the analog-to-digital converter, in particular because the bandpass sigma-delta analog-to-digital converter does not require the use of a programmable gain amplifier, makes it possible to reduce very considerably the total power consumption of the electronics of the ultrasound fluid meter, by up to 40%.

In addition, significantly improved measurement performance results from using the bandpass sigma-delta analog-to-digital converter in the measurement acquisition and processing system of the ultrasound fluid meter.

Figure 3:
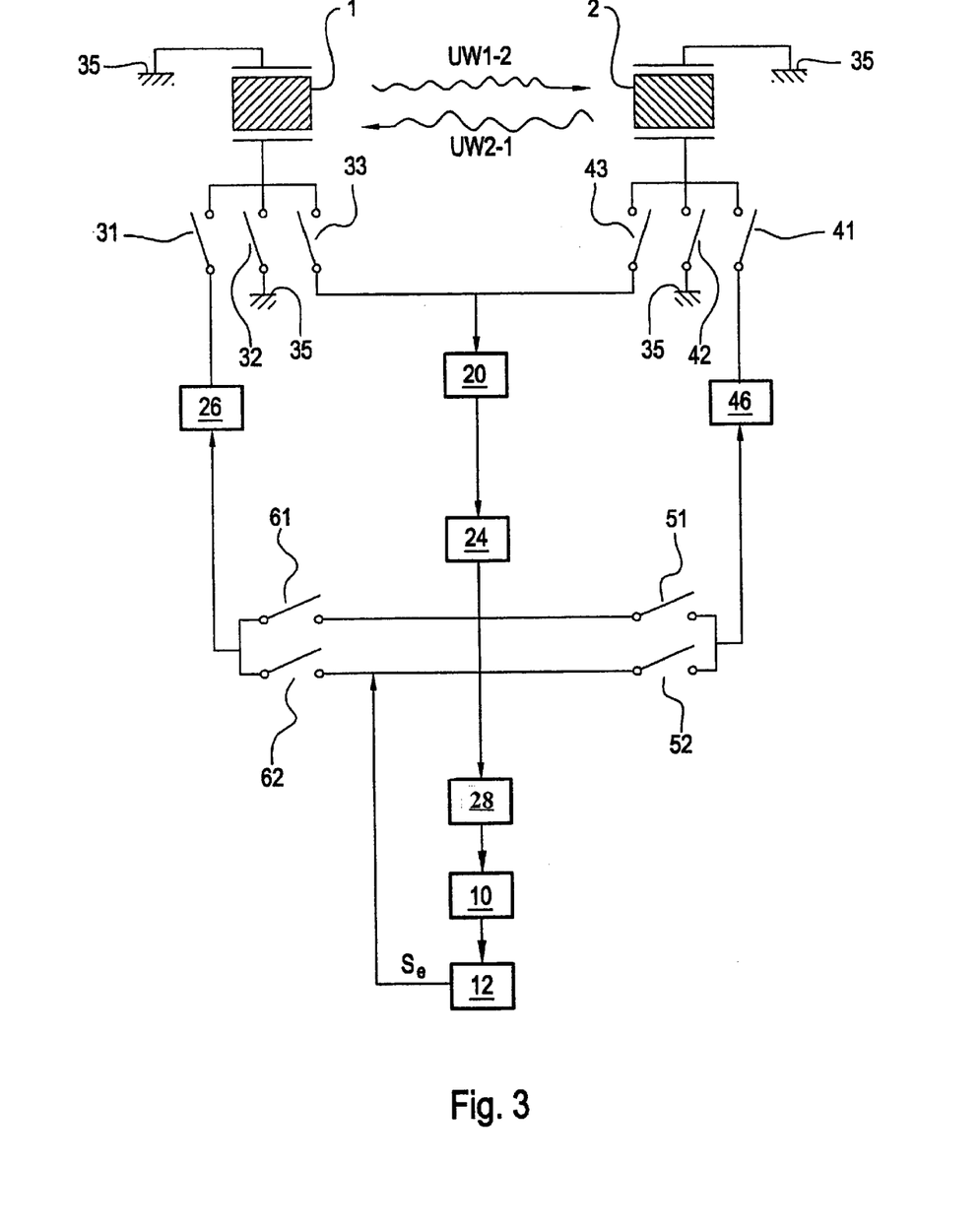
FIG. 3 is a block diagram of the acquisition system of the ultrasound apparatus for measuring fluid flow in the preferred embodiment of the invention.

FIG. 3 is a block diagram of the acquisition system of the fluid flow ultrasound measuring apparatus in the preferred embodiment of the invention. The preferred embodiment of the invention consists in replacing the bandpass filter 22 of the apparatus shown in FIG. 2 by the receiver transducer itself. The transducer is thus used not only as a receiver transducer, but also as a filter in the feedback loop of the sigma-delta converter. Feedback takes place physically via a mechanical magnitude in the receiver transducer.

In advantageous manner, the transducers 1 and 2 comprise respective piezoelectric plates each having two opposite surfaces, said surfaces being metallized for connection to the connection terminals of the transducer. One of the two terminals in each transducer 1 and 2 is permanently connected to ground 35. The other terminal of the transducer 1 or 2 is connected to switches 31, 32, 33 or the switches 41, 42, 43 respectively. Advantageously the switches 31, 32, 33 and 41, 42, 43 are implemented as two distinct multiplexers. The transducers 1 and 2 can be connected to ground 35 via their respective switches 32 or 42.

The transducer 1 is connected to an amplifier 20 via the switch 33. The output of said amplifier 20 is connected to an analog-to-digital converter 24. Advantageously, this analog-to-digital converter is a 1-bit analog-to-digital converter, e.g. a comparator. A digital-to-analog converter 26 is placed in the feedback loop associated with the transducer 1, the input of said digital-to-analog converter 26 being connected to the output of the analog-to-digital converter 24 via a switch 61. The output from said digital-to-analog converter 26 is connected to the transducer 1 via the switch 31. Advantageously, the digital-to-analog 26 is a 1-bit digital-to-analog converter. The transducer 1 is thus placed in the feedback loop when the switch 61 is closed and when the switches 31 and 33 are closed in succession, as described below.

The transducer 2 is connected to the amplifier 20 via a switch 43. A digital-to-analog converter 46 is placed in the feedback loop associated with the transducer 2, the input of said digital-to-analog converter 46 being connected to the output of the analog-to-digital converter 24 via the switch 51. The output from said digital-to-analog converter 46 is connected to the transducer 2 via the switch 41. Advantageously, the digital-to-analog converter 46 is a 1-bit digital-to-analog converter. The transducer 2 is thus placed in the feedback loop when the switch 51 and the switches 41 and 43 are closed in succession.

Figure 7:
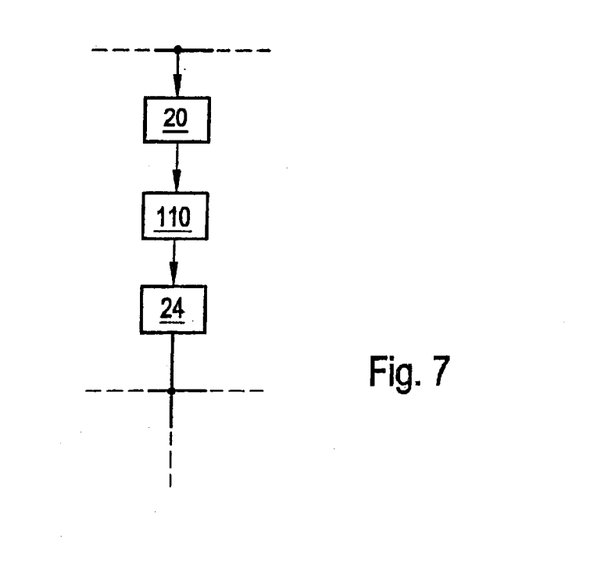
FIG. 7 shows a variant embodiment of the FIG. 3 apparatus.

In a variant embodiment shown in FIG. 7, at least one additional bandpass filter 110 is provided that is purely electrical and that is connected in series in conventional manner between the amplifier 20 and the analog-to-digital converter 24. The function of this additional filter is to improve the performance of the sigma-delta converter.

The remainder of the acquisition system of the fluid flow rate ultrasound measurement apparatus is identical to that shown in FIG. 3 and is therefore not shown.

In FIG. 3, the output from the analog-to-digital converter 24 is connected to the input of a filter 28. The output from the filter 28 is connected to RAM 10. The RAM 10 is connected to the microcontroller 12. The microcontroller 12 is connected via the switch 62 or 52 to the digital-to-analog converter 26 or 46 respectively.

In conventional manner, a battery (not shown) acts via a set of connections (not shown) to provide the power required to operate the various components.

The operation of the apparatus of FIG. 3 is described below, initially with reference to FIG. 4 for emitting an ultrasound wave from the transducer 1 to the transducer 2, and then with reference to FIG. 5 for emitting an ultrasound wave from the transducer 2 to the transducer 1.

Figure 4:
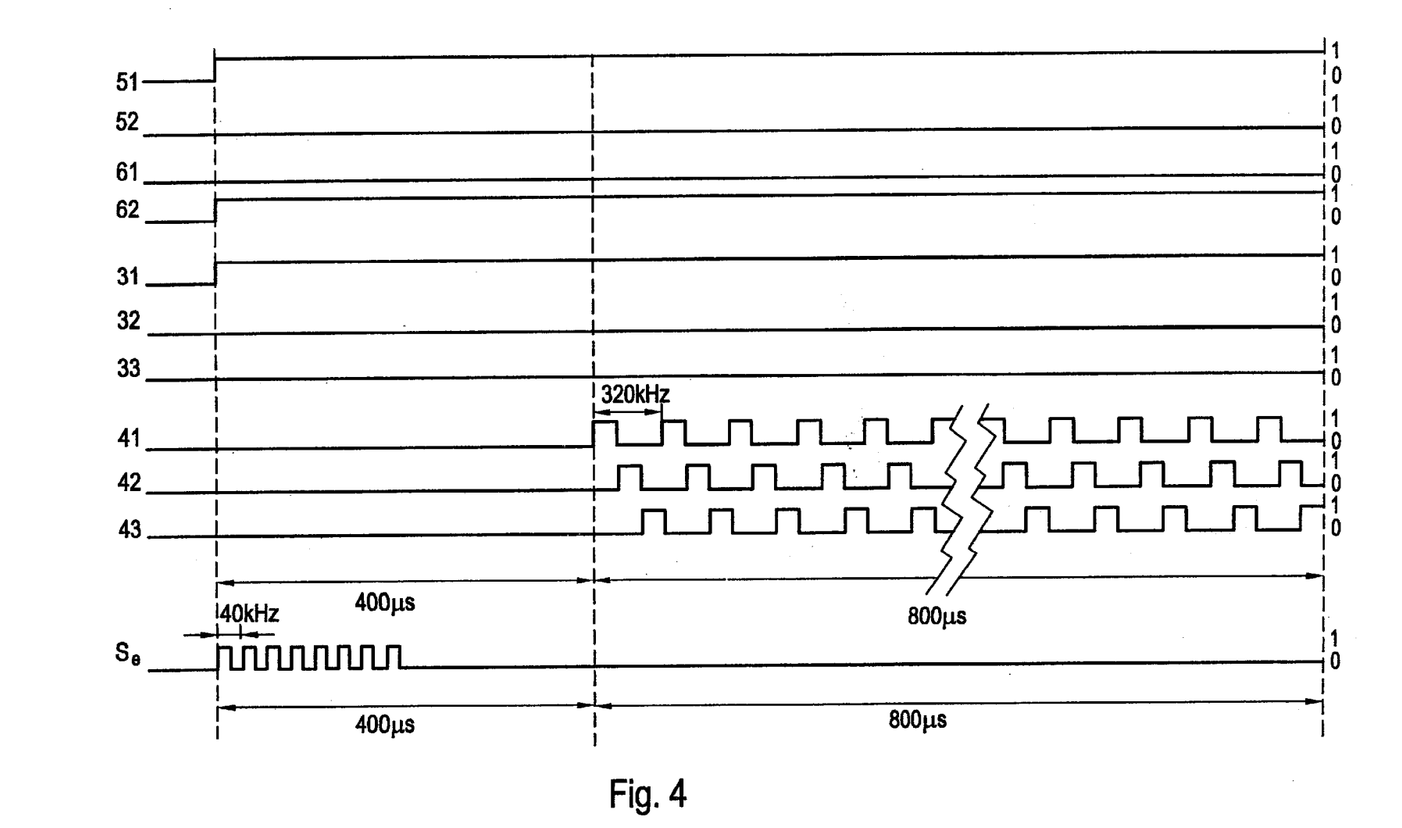
FIG. 4 is a timing diagram of signals for controlling the switches while the transducer 1 is emitting and the transducer 2 is receiving in the apparatus of FIG. 3.
Figure 5:
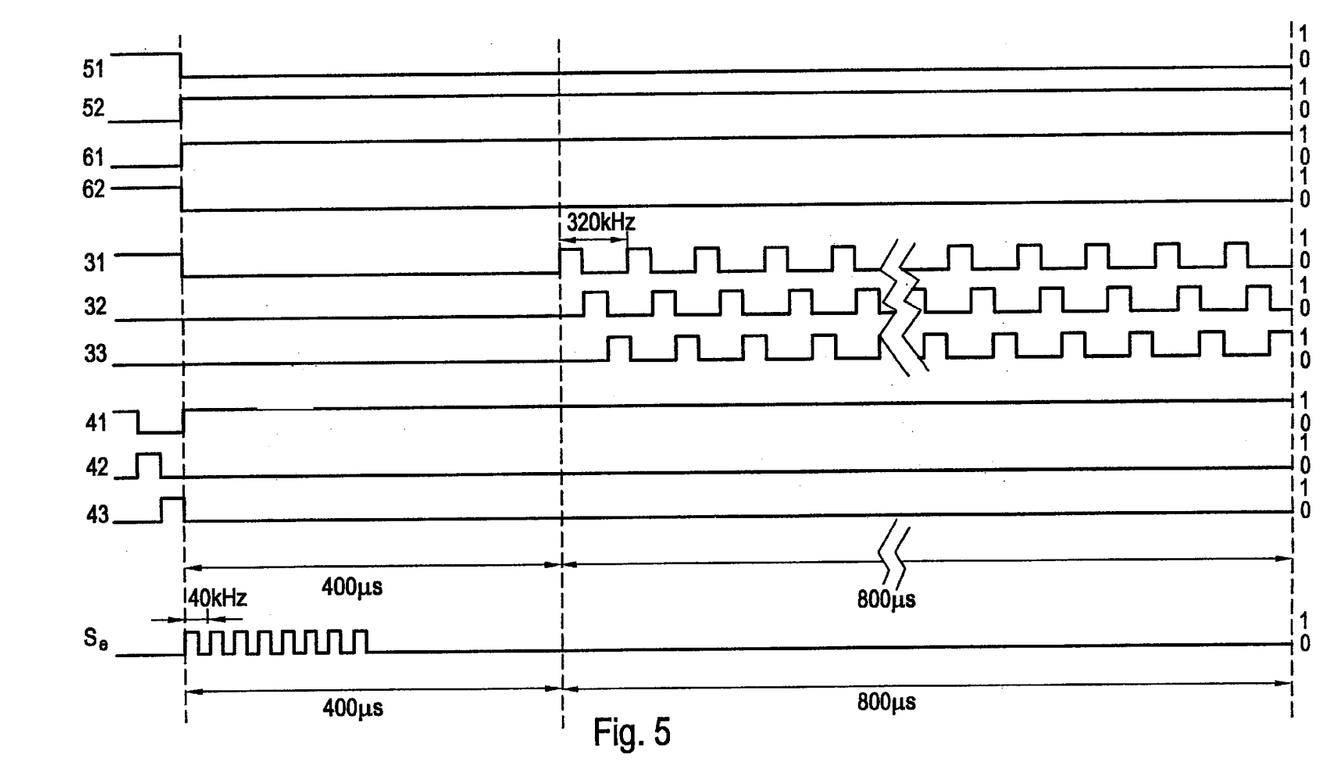
FIG. 5 is a timing diagram of signals for controlling the switches while the transducer 1 is receiving and the transducer 2 is emitting in the apparatus of FIG. 3.

In FIGS. 4 and 5, the states of the switches 51, 52; 61, 62; 31, 32, 33; and 41, 42, 43 are shown as a function of time, with the "1" and "0" states of a switch corresponding to the switch being closed or open, respectively. The opening and closing of all of the switches is under the control of the microcontroller in conventional manner. The microcontroller is connected to the switches via suitable wiring (not shown). The signal Se corresponds to the signal generated by the microcontroller 12 to excite the emitter transducer. The excitation signal Se is a squarewave signal, e.g. comprising eight periods at a frequency of 40 kHz and having peak-to-peak amplitude at the output from the digital-to-analog converter 26 or 46 of 200 millivolts (mV), for example. The acquisition of the ultrasound signal that has traveled along the cavity lasts for about 800 microseconds ($\mu$s) and begins about 400 $\mu$s after the emitter transducer begins to be excited by the signal Se, said duration corresponding to the transit time between the emitter transducer and the receiver transducer. The squarewave signals controlling the opening and closing of the switches concerned during the acquisition stage operate at a frequency of 320 kHz for example. It should be observed that the scale of the timing diagrams in FIG. 4 and 5 for the switches 41, 42, 43 or 31, 32, 33 during the acquisition stage is not the same for the other switches and for the signal Se.

During the stage in which an ultrasound wave UW1-2 is being emitted from the transducer 1 to the transducer 2, the microcontroller 12 issues an ultrasound wave emission sequence by generating a squarewave signal Se. The switches 62 and 31 are closed, and the squarewave signal from the microcontroller is transformed into an analog signal which excites the transducer 1 at its resonant frequency. The frequency applied to the terminals of the transducer 1 create a force by means of the inverse piezoelectric effect, thereby originating an ultrasound wave UW1-2 which propagates in the fluid flow towards the transducer 2. Although not essential, the switch 51 can already be closed during the emission stage. However, all of the other switches 52; 61; 32, 33; and 41, 42, 43 are open.

During the stage of acquiring the ultrasound wave, the switches 52; 61; and 32, 33 remain open while the switch 51 is closed. The positions of the switches 62 and 31 do not matter and they can be kept closed, for example. The switches 41, 42, and 43 are closed and opened successively at a frequency of 320 kHz, for example, so that when any one switch is closed for a duration equivalent to one-third of the period, the other two are open. Each period having a duration of 3.125 $\mu$s comprises three successive stages, a write stage when the switch 41 is closed, a stabilization stage when the switch 42 is closed, and a read stage when the switch 43 is closed.

The 1-bit analog-to-digital converter 24 outputs a high voltage level corresponding to a logic "1" if its input is subjected to an input voltage above an absolute threshold value. The analog-to-digital converter 24 outputs a low voltage level corresponding to a logic "0" if its input is subject to an input voltage below the absolute threshold voltage. The comparator 46 is an inverting digital-to-analog converter which outputs a positive reference voltage +Vref if its input is at "0" and a negative reference voltage −Vref if its input is at "1". At the beginning of the acquisition stage, the output from the analog-to-digital converter 24 is randomly in a "1" or a "0" state. Taking by way of example the case when its output is in a "1" state, the voltage applied by the comparator to the receiver transducer 2 during the write stage by closing the switch 41 is +Vref. Furthermore, when the switch 42 is closed during the stabilization stage, both terminals of the receiver transducer 2 are connected to ground 35. Since the transducer constituted by a piezoelectric plate is a resonator, the fact of subjecting it to a voltage +Vref during the write stage and then to a zero voltage during the stabilization stage will cause the receiver transducer to be put into forced oscillation. The position of the piezoelectric plate during its oscillation is then determined during the read stage by closing the switch 43. The acquisition stage begins shortly before the arrival of the ultrasound signal UW1-2 at the receiver transducer 2 so as to establish steady oscillating conditions in the receiver transducer 2. These steady oscillating conditions give rise to a binary stream of alternating "0" and "1" states in the loop of the sigma-delta converter. This binary stream makes it possible to maintain oscillation of the transducer under steady conditions by looping via the digital-to-analog converter 46. Thus, integrating the receiver transducer in the loop of the sigma-delta converter establishes servo-control, with the binary stream keeping the piezoelectric plate steady on average about its equilibrium position. The ultrasound wave UW1-2 is measured by detecting fluctuations in the steady conditions when the ultrasound wave UW1-2 reaches the receiver transducer 2. The oscillation then becomes the sum of the displacement force during the write stage and the disturbance due to the ultrasound signal reaching the receiver transducer. The binary stream is thus modified to cancel the effects of the disturbance so as to servo-control the piezoelectric plate by electrical feedback so that it remains steady on average about its equilibrium position. Given that the receiver transducer is a resonator, it acts as a memory in the sense that the longer the acquisition stage, the more the oscillation will be modified by the sum of the disturbances and the more the converter will be capable of detecting a small signal. Thus, the voltage across the terminals of the transducer is, by the superposition principle, the sum of the contribution coming from the ultrasound wave plus the contribution coming from the electrical feedback.

The operation of the apparatus is entirely analogous when emitting an ultrasound wave UW2-1 from the emitter transducer 2 to the receiver transducer 1. Reference can be made to FIG. 5 for the way in which the set of switches operates when acquiring an ultrasound wave UW2-1.

Thus, the apparatus of the invention provides a direct digital output which completely replaces the conventional acquisition system, while also simplifying it considerably. The apparatus of the invention makes it possible to eliminate quantization noise in the passband of the signal. Great precision can be obtained with apparatus of the invention without using a complex implementation since a mere comparator makes it possible, after filtering, to obtain resolution at the output from the sigma-delta converter that is in excess of 16 bits in the passband of the signal. The apparatus of the invention no longer requires a programmable gain amplifier to be used in order to obtain a full-scale signal for the analog-to-digital converter, which has the consequence of reducing complexity and power consumption by the converter system.

Figure 6:
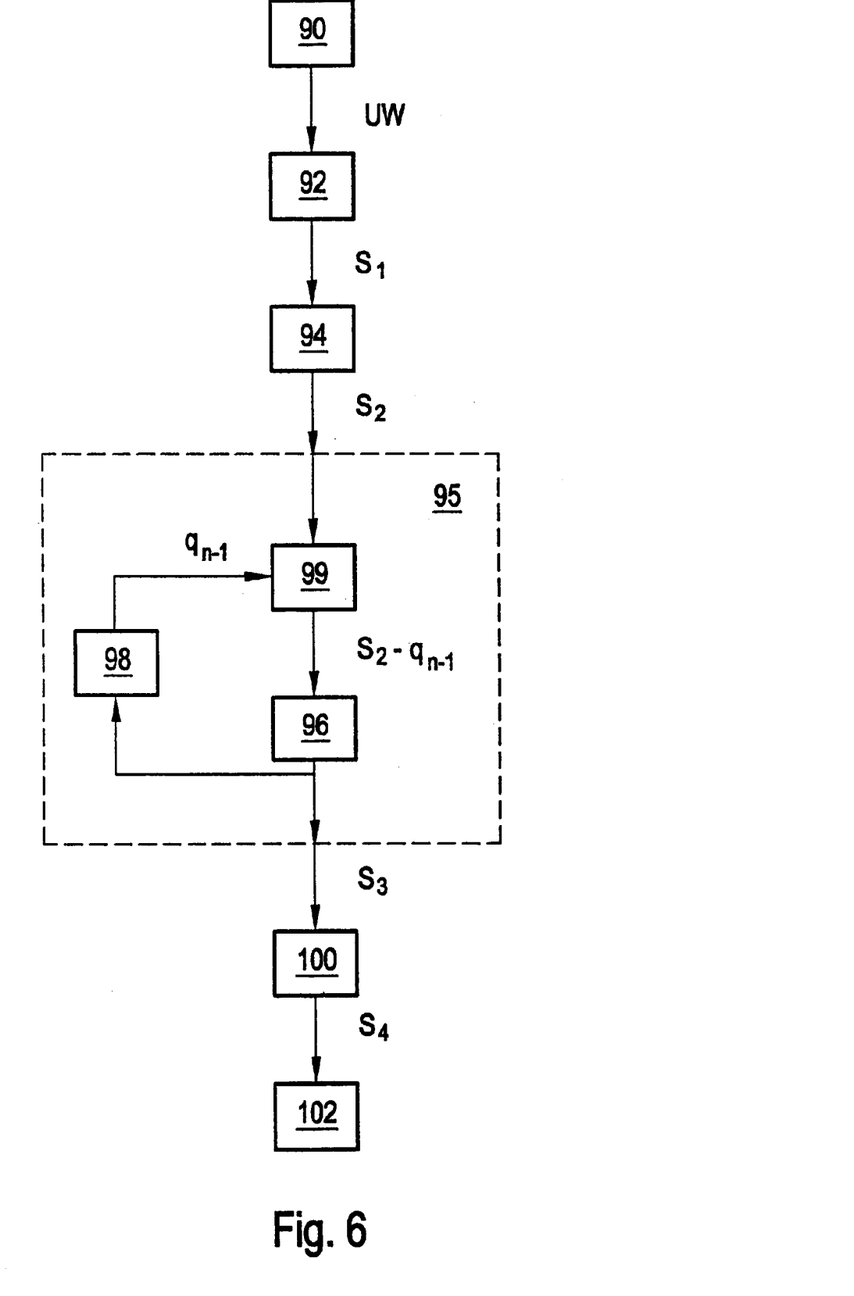
FIG. 6 shows the various steps of the method of the invention.

FIG. 6 shows the various steps of the method of the invention for using ultrasound to measure a fluid flow rate.

The fluid flow rate is advantageously determined by combining a propagation time measurement and an acoustic phase shift measurement in the acoustic signals propagating in the flowing fluid between the two transducers both in the upstream direction and in the downstream direction of the fluid flow.

The first step 90 of the ultrasound fluid flow measuring method consists in emitting an acoustic signal UW into the fluid whose flow rate is to be determined, e.g. in the upstream direction. The acoustic signal UW is transformed into an analog signal S1 during an acoustic-to-analog conversion step 92 by means of a receiver transducer. The appearance of the signal S1 is shown in FIG. 2.a. To avoid acquiring an acoustic wave that has been subject to multiple go-and-return trips between the transducers, the signal S1 is truncated in time during a truncating step 94. Truncation is performed in practice by using the switches to control when signal acquisition starts and stops. The analog signal S2 that results from this time truncation is shown in FIG. 2.c. The analog signal S2 is then transformed into a digital signal S3 during an analog-to-digital conversion step 95 by the processing means 21. This analog-to-digital conversion step 95 uses the above-described sigma-delta conversion technique. The digitized signal S3 shown in FIG. 2.e is encoded on 1 bit at a sampling frequency of 320 kHz. During first conversion of the analog signal S2 into a digital signal S3, in an estimation step 98, the sigma-delta converter serves to give an estimated conversion error q. During the following conversion, this estimated conversion error q is subtracted from the analog signal S2 that is to be digitized, during a subtraction step 99, such that the sigma-delta converter improves its estimated digitizing error q as successive conversions proceed. Thus, and in general, during analog-to-digital conversion step of order N, the sigma-delta converter subtracts an estimated quantization error $q_{N-1}$ determined during the preceding conversion of order N−1 of the analog signal S2. The analog signal minus the estimated quantization error S2-$q_{N-1}$ is then digitized during the digitization step 96. During an estimation step 98, the analog signal S2 minus the estimated quantization error $q_{N-1}$ gives rise to a new determination of the estimated quantization error $q_N$ that takes place during digitizing step 96 of order N. This estimate is used to improve the following digitization of order N+1. The digital signal S3 output from the sigma-delta converter is a signal encoded on 1 bit at high frequency. Advantageously, the step of converting the acoustic signal UW into an analog signal S1 and the step of determining an estimated quantization error q performed by the analog-to-digital converter are implemented in succession by means of the transducer which is used both as a receiver and as a bandpass filter in the sigma-delta converter.

During a filtering step 100, the signal S3 is converted into a signal at a lower data rate but encoded on a larger number of bits by means of a digital filter. The signal S4 that results from this filtering step 100 is shown in FIG. 2.g. The acoustic phase shifts and the propagation times are determined on the basis of the digitized signal S4 during a determination step 102.

Naturally, all of the above steps are performed again in the downstream direction. This enables flow rate to be determined on the basis of measured propagation times and/or acoustic phase shifts of the acoustic signals propagating in the flowing fluid between the two transducers in the upstream and downstream directions of fluid flow.

What is claimed is:

1. Ultrasound apparatus for measuring a fluid flow rate, the apparatus comprising:

first and second transducers placed in the fluid whose flow rate is to be determined, one of the transducers, also referred to as an "emitter" transducer, operating in emission mode while the other transducer, also referred to as a "receiver" transducer, operates in reception mode, the emitter transducer being designed to emit an ultrasound wave into the fluid and the receiver transducer being designed to transform said ultrasound signal into an analog signal, wherein the transducers comprise respective piezoelectric plates each having two opposite surfaces, said surfaces being metallized so as to be connected to connection terminals of the transducer, one of the two terminals of each transducer being permanently connected to ground, the other terminal being connected respectively to the output of the analog-to-digital converter, to ground, and to the input of the bandpass loop filter by means of switches, processor means for processing said analog signal, the processor means being connected to the receiver transducer and being designed to transform said analog signal into a digitized signal used for determining the fluid flow rate;

said analog signal processor means including a bandpass sigma-delta converter including:

a bandpass loop filter whose input is connected to the output of said receiver transducer;

an analog-to-digital converter whose input is connected to the output of said loop filter, the output of said analog-to-digital converter forming the digital output of said analog-to-digital converter; and a digital-to-analog converter forming a feedback loop, connecting the output of the analog-to-digital converter to the input of said loop filter.

2. Ultrasound apparatus for measuring fluid flow rate according to claim 1 wherein the bandpass sigma-delta converter comprises:

a 1-bit ananlog-to-digital converter; and a 1-bit digital-to-analog converter.

3. Ultrasound apparatus for measuring fluid flow rate according to claim 1, further comprising at least one additional bandpass loop filter interposed between the receiver transducer and the analog-to-digital converter.

4. Ultrasound apparatus for measuring a fluid flow rate according to claim 1, wherein the switches are implemented by means of a multiplexer.

5. Ultrasound apparatus for measuring a fluid flow rate according to claim 1, further comprising:

means for determining the fluid flow rate from the digitized signal.

6. Ultrasound apparatus for measuring a fluid flow rate according to claim 5, wherein the means for determining the fluid flow rate from the digitizing signal comprise a memory and microcontroller.

7. An ultrasound method of measuring a fluid flow rate between two transducers, in which the fluid flow rate is determined by measuring the propagation time and by measuring the phase shift of acoustic signals propagating in the flowing fluid between two transducers in the upstream and downstream directions of the fluid flow, said method being performed using first and second transducers placed in the fluid whose flow rate is to be determined, one of the transducers, also referred to as an "emitter" transducer, operating in emission mode while the other transducer, also referred to as a "receiver" transducer, operates in reception mode, the emitter transducer being designed to emit an ultrasound wave into the fluid and the receiver transducer being designed to transform said ultrasound signal into an analog signal, said method also using processor means for processing said analog signal, the processor means being connected to the receiver transducer and being designed to transform said analog signal into a digitized signal used for determining the fluid flow rate, said processor means including a bandpass sigma-delta converter including: a bandpass loop filter whose input is connected to the output of said receiver transducer; an analog-to-digital converter whose input is connected to the output of said loop filter, the output of said analog-to-digital converter forming the digital output of said analog-to-digital converter; and a digital-to-analog converter forming a feedback loop, connecting the output of the analog-to-digital converter to the input of said loop filter the method comprising:

an emission step including emitting an acoustic signal UW into the fluid whose flow rate is to be determined;

an acoustic-to-analog conversion step including transforming said acoustic signal UW into an analog signal S2;

an analog-to-digital conversion step of order N including transforming said analog signal S2 into a digital signal S3; and a step of determining acoustic phase shifts and propagation times including determining the acoustic phase shifts and the propagation times on the basis of the digitized signal S3;

the method being characterized in that the analog-to-digital conversion step of order N is implemented using said bandpass sigma-delta converter to perform:

an estimation step including estimating the quantization error $q_{n-1}$ that occurs during the digitizing step of order N−1, for use in the digitizing step of order N, wherein estimating the quantization error that occurred during the digitizing step is implemented in succession by means of the transducer used both as a receiver and as a bandpass filter in a sigma-delta converter, a subtraction step including subtracting the estimated quantization error $q_{n-1}$ from the analog signal S2; and a digitizing step including digitizing the analog signal S2 minus the estimated quantization error $q_{n-1}$.

8. An ultrasound method of measuring a fluid flow rate according to claim 7, wherein the acoustic-to-analog conversion step of transforming said acoustic signal UW into an analog signal S2 comprises:

a step of converting the acoustic signal UW into analog signal S1; and a step of truncating the analog signal S1 into an analog signal S2.

9. An ultrasound method of measuring a fluid flow rate according to claim 7, determining the acoustic phase shifts and the propagation times on the basis of the digitized signal S3 comprises:

a step of filtering the digital signal S3 into a filtered digital signal S4; and a step of calculating the acoustic phase shifts and/or the propagation times on the basis of the filtered digital signal S4.

10. The ultrasound method of measuring a fluid flow rate according to claim 7 wherein the bandpass sigma delta converter includes a receiver transducer.

* * * * *